(12) United States Patent
Tanabe et al.

(10) Patent No.: US 9,643,485 B2
(45) Date of Patent: May 9, 2017

(54) RESIN FUEL TANK

(71) Applicant: TOYOTA JIDOSHA KABUSHIKI KAISHA, Toyota-shi, Aichi-ken (JP)

(72) Inventors: Daisuke Tanabe, Nisshin (JP); Shinsuke Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/119,480

(22) PCT Filed: Jan. 19, 2015

(86) PCT No.: PCT/JP2015/052245
§ 371 (c)(1),
(2) Date: Aug. 17, 2016

(87) PCT Pub. No.: WO2015/125569
PCT Pub. Date: Aug. 27, 2015

(65) Prior Publication Data
US 2017/0050511 A1    Feb. 23, 2017

(30) Foreign Application Priority Data

Feb. 21, 2014   (JP) ................................. 2014-032229

(51) Int. Cl.
*B65D 88/12*     (2006.01)
*B60K 15/03*     (2006.01)
*B60K 15/067*    (2006.01)

(52) U.S. Cl.
CPC ...... *B60K 15/03177* (2013.01); *B60K 15/067* (2013.01); *B60K 2015/03328* (2013.01)

(58) Field of Classification Search
CPC .............. B60K 15/03; B60K 15/03006; B60K 15/03177; B60K 15/063; B60K 15/067;
(Continued)

(56) References Cited

U.S. PATENT DOCUMENTS 6,135,306 A * 10/2000 Clayton ........... B60K 15/03177
                                                     220/501
6,138,859 A * 10/2000 Aulph .................... B60K 15/03
                                                     137/574
(Continued)

FOREIGN PATENT DOCUMENTS

JP     2009-132296 A    6/2009
JP     2010-070097 A    4/2010
(Continued)

*Primary Examiner* — Steven A. Reynolds
*Assistant Examiner* — Javier A Pagan
(74) *Attorney, Agent, or Firm* — Oliff PLC

(57) ABSTRACT

A resin fuel tank includes a fuel tank main body (19) in which a closed space for storing fuel is formed in its interior; a built-in part (24) that is disposed within the closed space and is fixed to a wall portion of the fuel tank main body by at least two mounting portions (46); connecting portions (32, 34) of the built-in part, which are separated from the wall portion and that connect the two mounting portions (46); and deformation absorbing portions (48A, 48B) of the built-in part which are elastically deformable, are upside-down U-shaped as seen in side view and are provided between the mounting portions (46) and the connecting portions (32, 34), one ends (68A, 68B) of the deformation absorbing portions being fixed to the connecting portions, and other ends (56A, 56B) of the deformation absorbing portions being separated from the connecting portions in a height direction.

4 Claims, 6 Drawing Sheets

(58) Field of Classification Search
CPC .................. B60K 15/07; B60K 15/073; B60K 2015/03032
USPC ................ 220/562, 651, 652, 653, 563, 564
See application file for complete search history.

(56) References Cited

U.S. PATENT DOCUMENTS

| | | | |
|---|---|---|---|
| 8,608,012 B2* | 12/2013 | Aoki | B29C 49/20 |
| | | | 220/562 |
| 9,327,595 B2* | 5/2016 | Miyamoto | B60K 13/04 |
| 2009/0139994 A1* | 6/2009 | Aoki | B29C 49/20 |
| | | | 220/652 |
| 2011/0139793 A1* | 6/2011 | Park | B60K 15/03177 |
| | | | 220/563 |
| 2011/0174946 A1* | 7/2011 | Araya | B29C 49/20 |
| | | | 248/225.21 |
| 2015/0367726 A1* | 12/2015 | Taniguchi | B60K 15/067 |
| | | | 280/834 |

FOREIGN PATENT DOCUMENTS

| JP | 2010-076526 A | 4/2010 |
|---|---|---|
| JP | 2011-148337 A | 8/2011 |

* cited by examiner

RESIN FUEL TANK

CROSS-REFERENCE TO RELATED APPLICATION

This application is based on and claims priority under 35 USC 119 from Japanese Patent Application No. 2014-032229 filed on Feb. 21, 2014, the disclosure of which is incorporated by reference herein.

BACKGROUND

Technical Field

The present invention relates to a resin fuel tank.

Related Art

At a resin fuel tank of a vehicle, the fuel tank itself repeatedly expands/contracts due to positive pressure/negative pressure that is generally applied to the fuel tank. In order to reduce such deformation of the fuel tank, a structure in which a supporting member is interposed between the top wall and the bottom wall of the fuel tank and a damper is provided at the supporting member has been proposed (refer to Japanese Patent Application Laid-Open (JP-A) No. 2011-148337).

However, since a resin fuel tank is molded by blow molding, the built-in parts that are disposed within the fuel tank are fixed by molten resin at the time of the blow molding. Therefore, since the resin thermally contracts at the time of molding but the built-in parts do not deform, there is the concern that stress may concentrate at the fixed positions of the built-in parts at the wall surfaces of the fuel tank, and warping or the like will occur.

There is room for improvement of the above-described related art with regard to this point.

SUMMARY

In consideration of the above-described circumstances, the present invention provides a resin fuel tank at which concentration of stress at wall portions is reduced and deformation of the fuel tank is prevented.

An aspect of the present invention is a resin fuel tank including: a fuel tank main body in which a closed space for storing fuel is formed in its interior; a built-in part that is disposed within the closed space and is fixed to a wall portion of the fuel tank main body by at least two mounting portions; connecting portions of the built-in part, which are separated from the wall portion and that connect the two mounting portions; and deformation absorbing portions of the built-in part, which are elastically deformable, are upside-down U-shaped as seen in side view, and are provided between the mounting portions and the connecting portions, one ends of the deformation absorbing portions being fixed to the connecting portions, and other ends of the deformation absorbing portions being separated from the connecting portions in a height direction.

In the resin fuel tank of the present aspect, the built-in part is fixed to one wall portion of the fuel tank main body at the mounting portions at at least two places. The mounting portions of the built-in part are connected by the connecting portions. The deformation absorbing portions, that are elastically deformable and that are upside-down U-shaped as seen in side view, are provided between the connecting portions and the mounting portions.

Accordingly, in cases in which thermal contraction arises at the wall portion of the fuel tank main body due to cooling after blow molding, due to the deformation absorbing portions, which are upside-down U-shaped as seen in side view, of the built-in part deforming, the mounting portions can follow the contraction (displacement) of the wall portion, and stress concentrating at the fixed position of the built-in part at the wall portion may be prevented.

Further, at the time when the fuel tank main body deforms (expands/contracts) in a direction orthogonal to the wall portion, displacement of the mounting portions that accompanies the deformation of the wall portion is absorbed by deformation of the deformation absorbing portions that are upside-down U-shaped as seen in side view. Therefore, displacement of the connecting portion side is prevented or suppressed. Accordingly, at the time of expanding/contracting deformation of the fuel tank main body, the portions from the mounting portions to the deformation absorbing portions, or the wall portion of the fuel tank main body, abut the connecting portion side, and deformation of the wall portion is stopped. Namely, deformation of the fuel tank main body is prevented.

The above-described aspect may further include reinforcing portions that are provided at boundary portions between the deformation absorbing portions and the connecting portions, and whose plate thickness is thicker than a plate thickness of the deformation absorbing portions.

In this resin fuel tank, the rigidity and strength decrease due to the plate thickness being changed between the reinforcing portions and the deformation absorbing portions. Therefore, in a case in which load of a predetermined value or more is applied to the built-in part, the built-in part is broken at the boundary portions of the reinforcing portions and the deformation absorbing portions. As a result, stress of a predetermined value or more concentrating at the fixed position of the built-in part at the wall portion of the fuel tank main body may be prevented.

The above-described aspect may further include abutting portions that are provided at the connecting portions; and first contact portions that are provided between the deformation absorbing portions and the mounting portions, and that contact the abutting portions due to the abutting portions moving relatively to the mounting portions along the wall portion in a first direction.

In this resin fuel tank, at the time of cooling after blow molding, the wall portion of the fuel tank main body contractingly deforms along the wall surface. As a result, the mounting portions of the built-in part that is fixed to the wall portion are displaced so as to follow the wall portion, due to deformation of the deformation absorbing portions. At this time, by placing the built-in part within the fuel tank main body such that the first direction coincides with the direction of displacement, the first contact portions move relative to and can abut the abutting portions accompanying the displacement of the mounting portions. As a result, the amount of displacement of the mounting portions may be restricted.

The above-described structure may further include second contact portions that are provided between the deformation absorbing portions and the mounting portions, and that contact the abutting portions due to the abutting portions moving relatively to the mounting portions along the wall portion in a second direction that is a direction opposite from the first direction.

In this resin fuel tank, in the thermal contraction at the time of blow molding, the wall portion of the fuel tank main body contractingly deforms along the wall surface. At this time, in a case in which the direction of contraction of the wall surface cannot be predicted, by providing the second contact portions also in the second direction that is the direction opposite the first direction, deformation of the mounting portions may be restricted in cases in which the wall portion contracts in either direction.

Due to the above-described structure, the present aspect may reduce concentration of stress at fixed points of a built-in part at a wall surface of a fuel tank main body due to thermal contraction at the time of molding, and may prevent deformation of the fuel tank.

BRIEF DESCRIPTION OF THE DRAWINGS

An exemplary embodiment of the present invention will be described in detail based on the following figures, wherein.

DETAILED DESCRIPTION

A resin fuel tank relating to an exemplary embodiment is described with reference to FIG. 1 through FIG. 6.

Hereinafter, in the respective drawings, the length directions of a fuel tank and a built-in part are indicated by the arrow X direction, the short-side directions are indicated by the arrow Y direction, and the upward direction is indicated by the arrow Z direction. Note that, although various parts are mounted within the resin fuel tank, only the part that relates to the present embodiment is illustrated, and illustration of other parts is omitted.

First, a resin fuel tank in a state of mounting to a vehicle is described with reference to FIG. 1 through FIG. 4.

Figure 1:
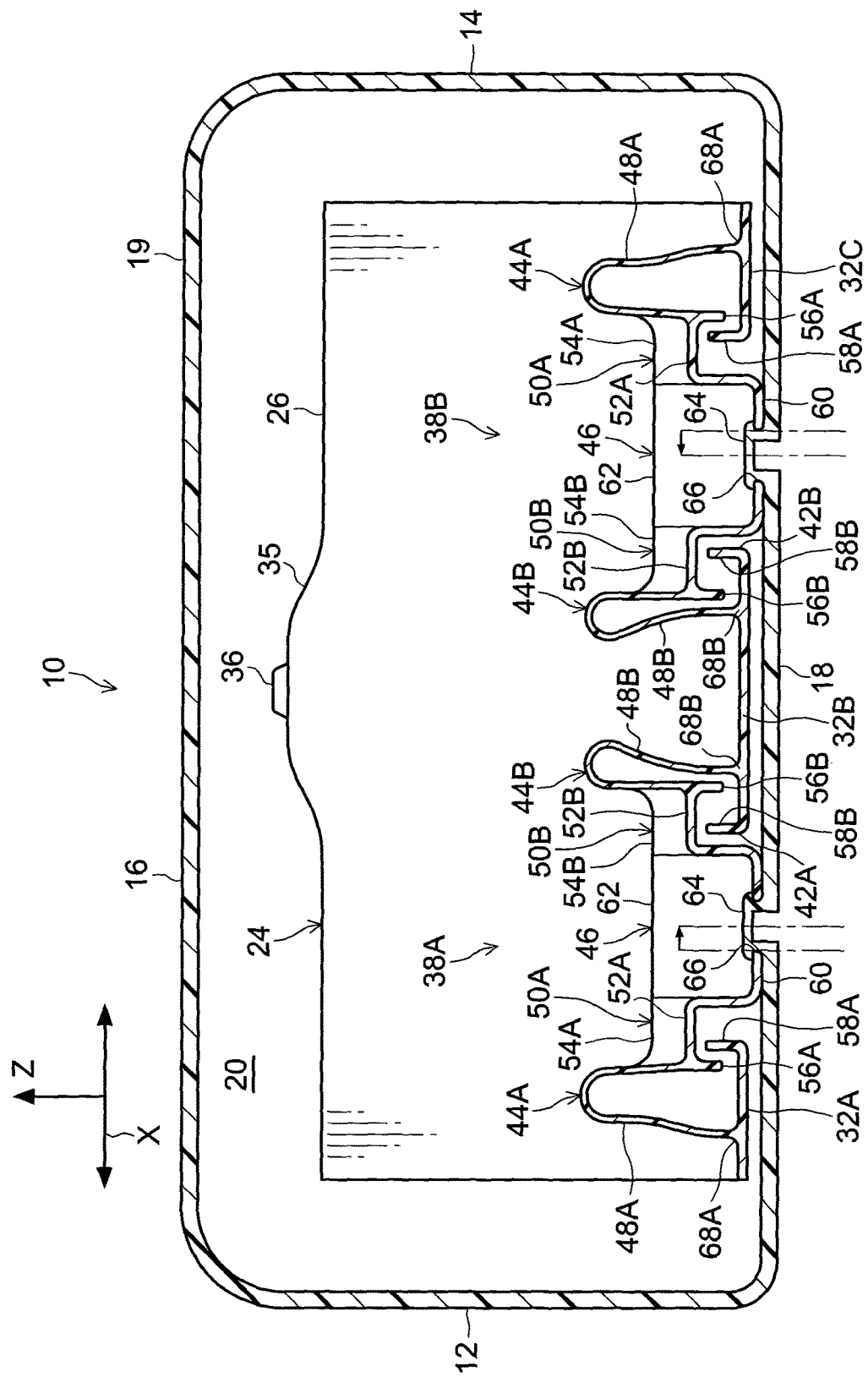
FIG. 1 is a vertical sectional view of a resin fuel tank relating to an embodiment.

As shown in FIG. 1, at a resin fuel tank 10, a closed space 20 that stores fuel is formed at the interior of a fuel tank main body 19 that has a front wall 12, a rear wall 14, a top wall 16 and a bottom wall 18.

Figure 2:
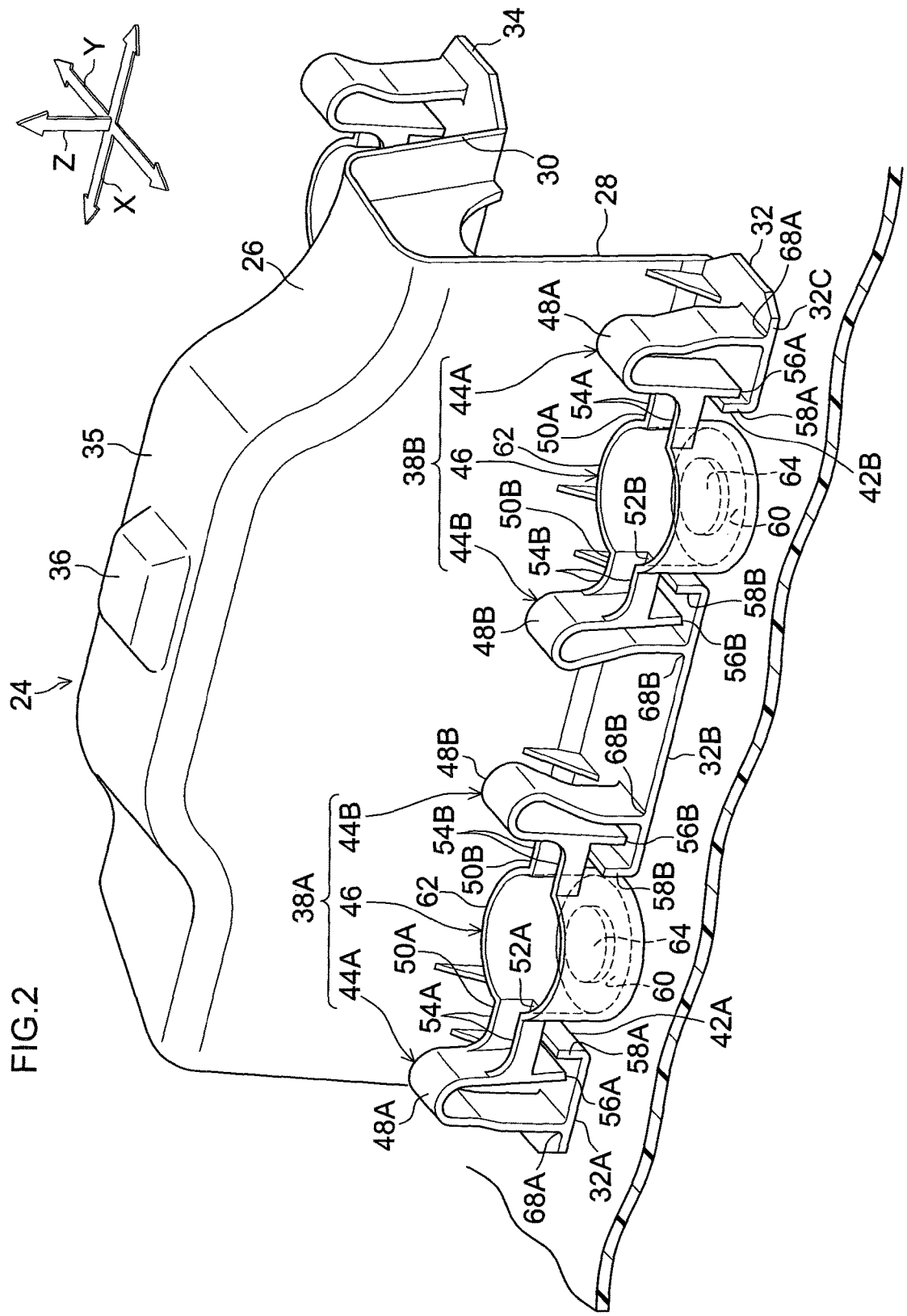
FIG. 2 is a perspective view of a built-in part relating to the embodiment.

Within the resin fuel tank 10, a built-in part 24 is fixed on the bottom wall 18 along the length direction (the arrow X direction). As shown in FIG. 2, the built-in part 24 has a top wall 26, side walls 28, 30 that extend downward from the both ends in the short-side direction (the arrow Y direction) of the top wall 26, and flange portions 32, 34 that extend in the short-side direction from the lower ends of the side walls 28, 30. The built-in part 24 is formed in the shape of a hat as seen in the length direction.

A convex portion 35, that projects-out toward the upper side (in the arrow Z direction) is formed at the top wall 26 of the built-in part 24 at its length direction central portion. A projecting portion 36 that projects-out further toward the upper side is formed at the central portion of the convex portion 35.

Moreover, as shown in FIG. 2, crimp portions 38A, 38B, for fixing to the bottom wall 18 of the fuel tank main body 19, are provided at the built-in part 24 along the length direction (the arrow X direction) of the flange portion 32. Note that crimp portions are formed also at the flange portion 34 side, but since they are configured similarly to those at the flange portion 32 side, description thereof is omitted.

As shown in FIG. 2, cut-out portions 42A, 42B, at which portions of the flange portion 32 are cut-out in the short-side direction at two places along the length direction, are formed in the flange portion 32. The flange portion 32 is divided into three fixed portions 32A-32C by these cut-out portions 42A, 42B.

The crimp portion 38A includes tongue pieces 44A, 44B that extend into the cut-out portion 42A from the fixed portions 32A, 32B, and an anchor stand 46 that is circular and is supported by the tongue pieces 44A, 44B.

As shown in FIG. 1 and FIG. 2, the tongue piece 44A is formed from a deformation absorption portion 48A, that is elastically deformable and is formed in an upside-down U-shape as seen in side view and is formed on the upper portion of the fixed portion 32A, and a joining portion 50A that extends toward the anchor stand 46 from the anchor stand 46 side of the deformation absorbing portion 48A.

As shown in FIG. 1 and FIG. 2, the deformation absorbing portion 48A extends upward from one end at the fixed portion 32A side, and turns back in an upside-down U-shape, and the other end that extends downward is positioned so as to be apart from the fixed portion 32A above the fixed portion 32A. The joining portion 50A that extends toward the anchor stand 46 is formed from the other end side of the deformation absorbing portion 48A.

This joining portion 50A is formed in the shape of a trough from a bottom wall 52A that extends horizontally and vertical walls 54A that are formed at the Y direction both sides thereof. The joining portion 50A is joined to the upper portion of a vertical wall 62 of the anchor stand 46 that is described later.

Note that, at the deformation absorbing portion 48A, the portion that is further toward the other end (lower) side than the portion that is joined to the bottom wall 52A of the joining portion 50A is a stopper 56A.

On the other hand, an expansion restricting portion 58A that is bent upward is formed at the cut-out portion 42A side end portion of the fixed portion 32A. This expansion restricting portion 58A is formed to have a height that is higher than the lower end of the stopper 56A. Accordingly, as will be described later, a configuration is made in which, when the expansion restricting portion 58A moves relative to the stopper 56A or the vertical wall 62 by a predetermined amount or more in the X direction, the expansion restricting portion 58A abuts the stopper 56A or the vertical wall 62, and the relative movement is restricted.

Moreover, a root portion 68A that is the boundary between the deformation absorbing portion 48A and the fixed portion 32A is formed such that the plate thickness thereof is thicker than that of the deformation absorbing portion 48A.

Since the tongue piece 44B also has a similar structure, elements that are similar to those of the tongue piece 44A have B appended to the same reference numbers, and detailed description thereof is omitted.

Next, as shown in FIG. 2, the anchor stand 46 is formed from a bottom portion 60 that is circular and the vertical wall 62 that circles-around along the periphery thereof. A hole portion 66 (see FIG. 1), into which is inserted a convex portion (a dowel) 64 that is formed at the bottom wall 18 of the fuel tank main body 19, is formed at the center of the bottom portion 60 (see FIG. 1). At the time when the built-in part 24 is set at the bottom wall 18 of the fuel tank main body 19, the convex portions 64 of the bottom wall 18 are inserted into the hole portions 66 of the anchor stands 46 of the built-in part 24, and the built-in part 24 is fixed to the fuel tank main body 19 due to the head portions of the convex portions 64 being crushed (crimped).

Note that the configuration of the crimp portion 38B is similar to the crimp portion 30A, and the same elements are denoted by the same reference numerals, and detailed description thereof is omitted. Note that, with regard to the tongue pieces 44A, 44B, the tongue pieces at the length direction end portion sides are tongue pieces 44A, and the tongue pieces at the central (projecting portion 36) side are tongue pieces 44B.

Figure 3:
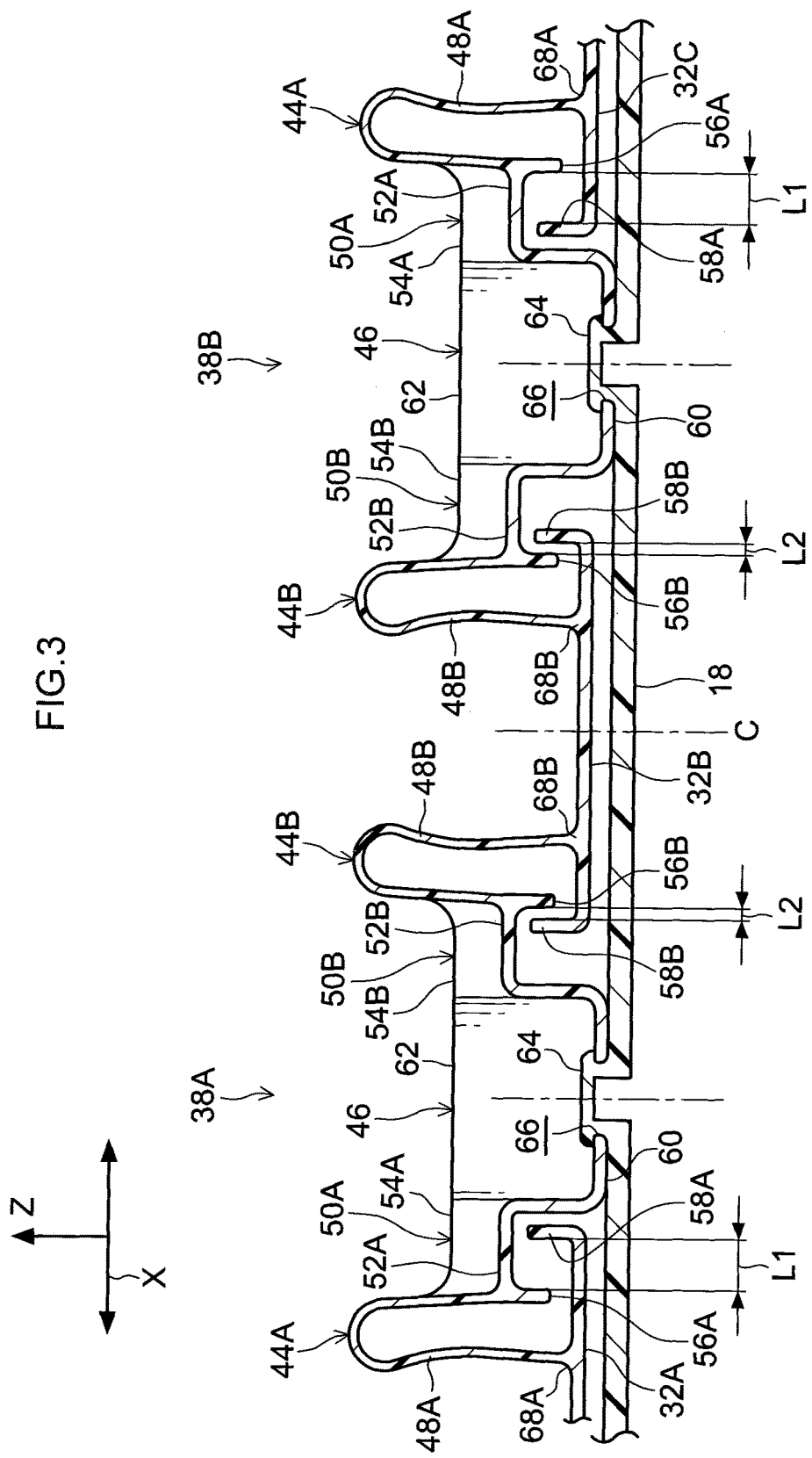
FIG. 3 is a partial vertical sectional view showing a configuration of mounting the built-in part to a bottom wall of the resin fuel tank at a time of blow molding, relating to the embodiment.

At the crimp portions 38A, 38B of the built-in part 24, as shown in FIG. 3, in the initial state (the mounted state at the time of blow molding), intervals (length direction distances) L1 between the expansion restricting portions 58A and the stoppers 56A of the tongue pieces 44A at the length direction end portion sides are formed to be longer than intervals (length direction distances) L2 between the expansion restricting portions 58B and the stoppers 56B of the tongue pieces 44B at the length direction central side.

Operation of the resin fuel tank 10 that is configured as above is described.

First, operation at the time of molding is described.

When manufacturing the resin fuel tank 10, sheet-shaped molten resin are shaped in an upper mold and a lower mold, and the built-in part 24 and the like are set therein. Thereafter, the mold is closed, blow molding is carried out, the molten resin is cooled, and thereafter, the resin fuel tank 10 is taken-out from the mold.

Figure 4:
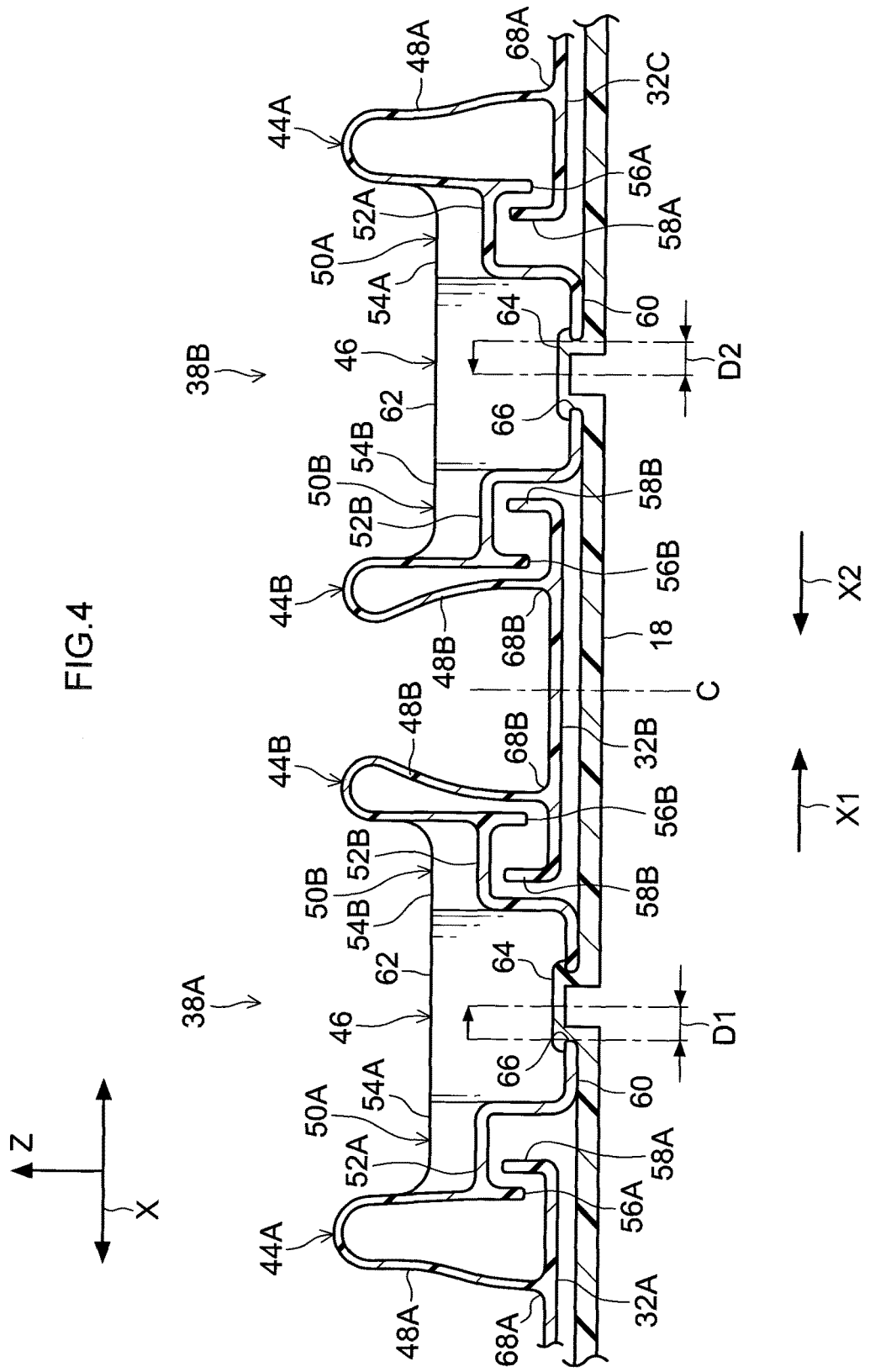
FIG. 4 is a partial vertical sectional view showing the configuration of mounting the built-in part to the bottom wall of the resin fuel tank at a time of thermal contraction, relating to the embodiment.

Due to this cooling, the resin fuel tank main body 19 contracts on the whole. At this time, as shown in FIG. 4, the bottom wall 18 also contracts on the whole toward center C (refer to FIG. 3 to FIG. 4, the arrow X1 direction, the arrow X2 direction). The built-in part 24 does not contract since it is a rigid body. However, due to the tongue pieces 44A, 44B of the crimp portions 38A, 38B deforming, the anchor stands 46 (the bottom portions 60) are displaced so as to follow the contraction of the bottom wall 18. Specifically, accompanying the contraction of the bottom wall 18, the deformation absorbing portion 48A of the tongue piece 44A of the crimp portion 38A widens, and the deformation absorbing portion 48B of the tongue piece 44B bends. Due thereto, the anchor stand 46 moves by distance D1 in the arrow X1 direction toward the center C of the bottom wall 18. Similarly, at the crimp portion 38B as well, the deformation absorbing portions 48A, 48B deform, and the anchor stand 46 moves by distance D2 in the arrow X2 direction toward the center C of the bottom wall 18.

Due thereto, the anchor stands 46 (the bottom portions 60) of the crimp portions 38A, 38B can be displaced along the direction of contraction of the bottom wall 18, and stress concentrating at the bottom wall 18 at the crimped positions of the convex portions 64 (the fixed position of the built-in part 24) due to thermal contraction at the time of molding may be prevented.

Note that, at this time, accompanying the movement of the anchor stands 46 (the bottom portions 60), the vertical walls 62 and the stoppers 56A, 56B are displaced. Since the intervals L1, L2 in the X direction are formed between the stoppers 56A and the expansion restricting portions 58A, and between the stoppers 56B and the expansion restricting portions 58B, relative movement of the expansion restricting portions 58A, 58B with respect to the stoppers 56A, 56B that accompanies movement of the anchor stands 46 is allowed. Namely, the expansion restricting portions 58A, 58B can move relatively between the vertical walls 62 of the anchor stands 46 and the stoppers 56A, 56B, and the distance over which the expansion restricting portions 58A, 58B can move is made to be the distance over which the anchor stands 46 (the bottom portions 60) can move.

In a case in which the contraction direction is predicted by the mount position of the built-in part 24 with respect to the bottom wall 18 as in the present embodiment, it is effective to set the intervals L1, L2 in accordance with the contraction direction as shown in FIG. 3. For example, at the crimped portion 38A, it can be predicted that the stoppers 56A, 56B will be displaced toward the right side (in the arrow X1 direction) due to contraction of the bottom wall 18 (i.e., the expansion restricting portions 58A, 58B will be relatively displaced toward the left side with respect to the stoppers 56A, 56B). Accordingly, by setting the interval L1 of the tongue piece 44A to be large and the interval L2 of the tongue piece 44B to be small, the amount of relative movement of the expansion restricting portion 58A with respect to the stopper 56A, and the expansion restricting portion 58B with respect to the vertical wall 62, may be ensured to be large.

Further, the heights of the expansion restricting portions 58A, 58B are formed to be higher than the bottom ends of the stoppers 56A, 56B in the assembled state (refer to FIG. 3), in order to prevent the amount of relative movement of the expansion restricting portions 58A, 58B from being excessive and the expansion restricting portions 58A, 58B entering into the inner sides of the U portions of the deformation absorbing portions 48A, 48B. For example, if the amount of contraction of the bottom wall 18 is excessive and the amount of displacement in the X direction of the bottom portion 60 is larger than the interval L1, the stopper 56A abuts the expansion restricting portion 58A, and the expansion restricting portion 58A reliably prevented from entering into the interior of the deformation absorbing portion 48A.

Operation at the time of using the fuel tank 10 is described next.

The initial state of the crimp portions 38A, 38B of the built-in part 24 with respect to the fuel tank 10 at the time of usage is as shown in FIG. 4 due to displacement caused by thermal contraction at the time of blow molding.

Figure 5:
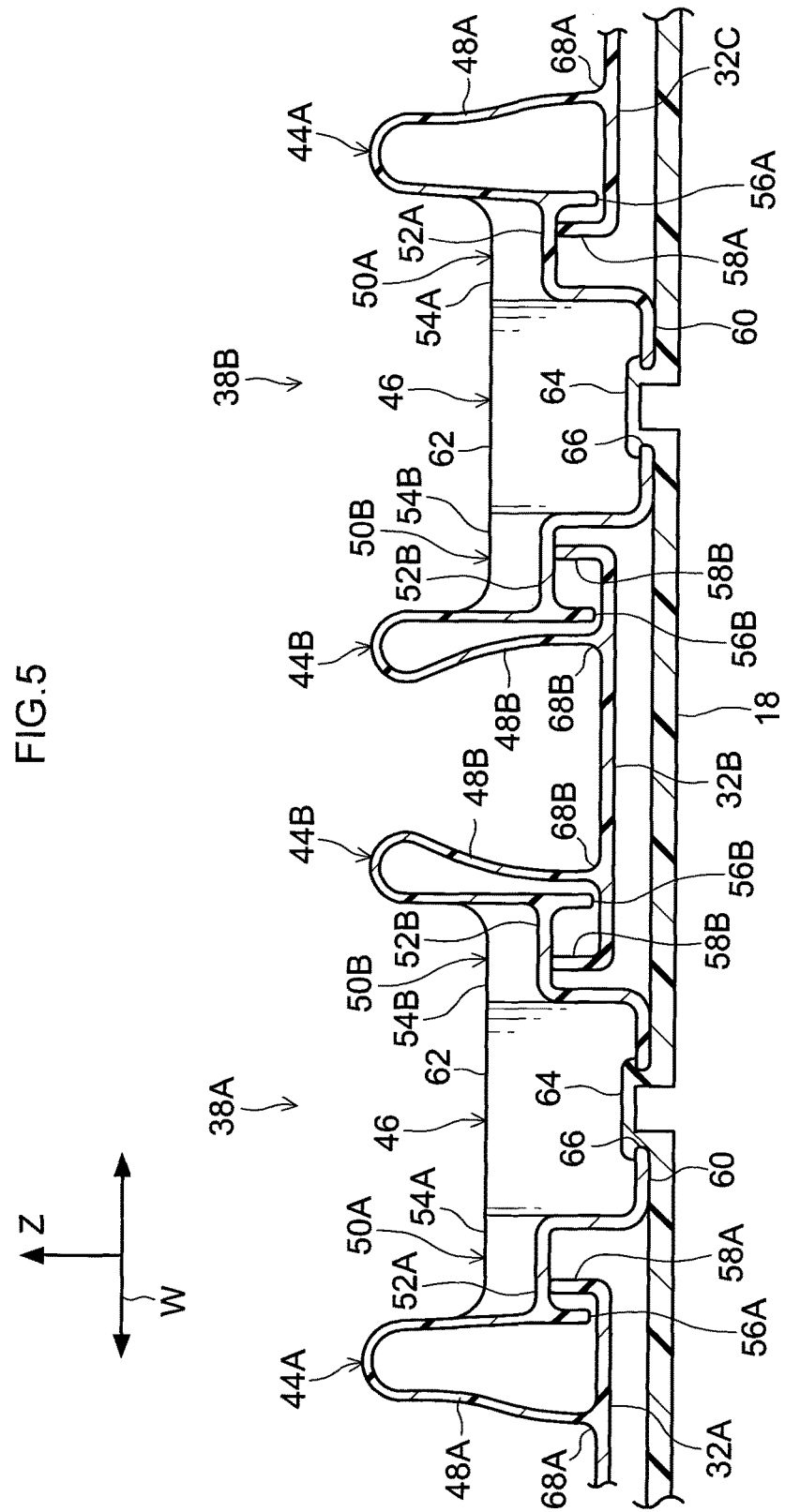
FIG. 5 is a partial vertical sectional view showing the configuration of mounting the built-in part to the bottom wall of the resin fuel tank at a time of expanding deformation, relating to the embodiment.

Here, when positive pressure is applied to the fuel tank 10 and the fuel tank 10 expands, the bottom wall 18 is displaced downward (refer to FIG. 4 to FIG. 5). As a result, the joining portions 50A, 50B, that are continuous with the anchor stands 46 (the bottom portions 60) that are fixed by crimping to the bottom wall 18, also are displaced downward. Since this displacement is absorbed by deformation of the deformation absorbing portions 48A, 48B, the fixed portions 32A-32C are not displaced. As a result, the bottom walls 52A, 52B of the joining portions 50A, 50B that are displaced downward abut the expansion restricting portions 58A, 58B that are formed at the distal ends of the fixed portions 32A-32C. Thereby, expanding deformation of the bottom wall 18 that is fixed by crimping to the anchor stands 46 of the built-in part 24 is stopped. Namely, expanding deformation of the bottom wall 18 due to positive pressure may be prevented.

Figure 6:
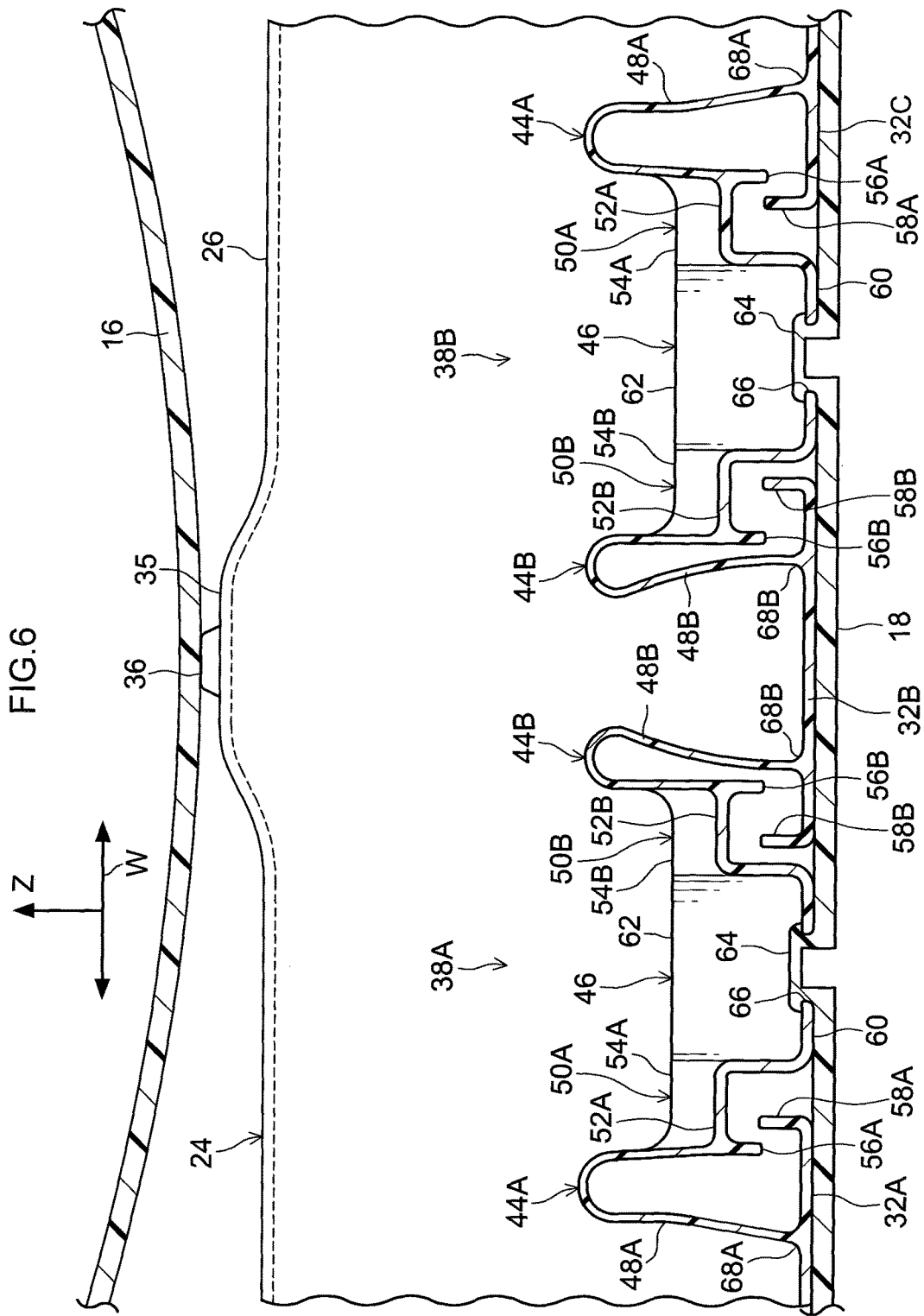
FIG. 6 is a partial vertical sectional view showing the configuration of mounting the built-in part to the resin fuel tank at a time of contracting deformation, relating to the embodiment.

Further, when negative pressure is applied to the fuel tank 10 and the fuel tank 10 contracts, the bottom wall 18 is displaced upward and the top wall 16 is displaced downward (refer to FIG. 4 and FIG. 6).

As a result, the joining portion 50A and the joining portion 50B that are continuous with the anchor stands 46 (the bottom portions 60) fixed by crimping to the bottom wall 18 are also displaced upward. Since this displacement is absorbed by deformation of the deformation absorbing portions 48A, 48B, the fixed portions 32A-32C are not displaced. As a result, the bottom wall 18 that is displaced upward abuts the fixed portions 32A-32C. Thereby, contracting deformation of the bottom wall 18 that is fixed by crimping to the anchor stands 46 of the built-in part 24 is stopped. Namely, contracting deformation of the bottom wall 18 due to negative pressure may be prevented.

Further, due to the top wall 16 being displaced downward, the top wall 16 abuts the projecting portion 36 of the top wall 26 of the built-in part 24. As a result, the top wall 16 is supported by the projecting portion 36, and downward deformation of the top wall 16 is suppressed. Namely, contracting deformation of the top wall 16 due to negative pressure may be prevented.

In this way, deformation of the fuel tank main body 19 (the top wall 16, the bottom wall 18) is prevented above and below the built-in part 24. Therefore, contracting deformation of the fuel tank main body 19 may be reliably prevented.

Further, the fuel tank 10 is configured such that the tongue pieces 44A, 44B (the deformation absorbing portions 48A, 48B) are provided between the fixed portions 32A-32C of the built-in part 24 and the anchor stands 46 that crimp and fix the built-in part 24 to the fuel tank main body 19, in order to absorb deformation of the bottom wall 18. Accordingly, the anchor stands 46 can be displaced so as to follow the bottom wall 18 that thermally contracts at the time of blow molding. As a result, stress concentrating at the fixed position of the built-in part 24 at the bottom wall 18 at the time of thermal contraction is prevented. Concentrations of stress that are due not only to the problem of thermal contraction, but also due to errors in dimensions, or errors in assembly, or differences in the material properties (swelling, linear expansion, or the like) of the fuel tank main body 19 and the built-in part 24, or the like, may also be prevented similarly.

Further, since the expansion restricting portions 58A, 58B are provided at the fixed portions 38A to 38C, when positive pressure is applied to the fuel tank main body 19, the bottom walls 52A, 52B of the joining portions 50A, 50B, that are displaced integrally with the bottom wall 18, abut the expansion restricting portions 58A, 58B. As a result, deformation (expansion) of the bottom wall 18 that is crimped and fixed to the anchor stands 46 (the bottom portions 60) continuous with the bottom walls 52A, 52B is prevented.

Moreover, the displacement of the anchor stands 46 in a case in which the bottom wall 18 deforms is absorbed by deformation of the deformation absorbing portions 48A, 48B of the tongue pieces 44A, 44B. Therefore, displacement is not transmitted to the fixed portion 32A to 32C. Accordingly, when negative pressure is applied to the fuel tank main body 19, deformation (contraction) of the bottom wall 18 is prevented due to the bottom wall 18, which deforms upwardly, abutting the fixed portions 32A to 32C. At this time, due to the top wall 16 abutting the projecting portion 36 of the built-in part 24, deformation of the top wall 16 also is prevented.

Further, the expansion restricting portions 58A, 58B can move relatively between the vertical walls 62 and the stoppers 56A, 56B. Accordingly, by adjusting the distances between the stoppers 56A, 56B and the vertical walls 62, the distances over which the expansion restricting portions 58A, 58B relatively move along the arrow X direction (the moving distances of the bottom portions 60) may be adjusted.

Still further, the height of the expansion restricting portions 58A, 58B of the fixed portions 32A to 32C are formed to be higher than the lower ends of the stoppers 56A, 56B of the tongue pieces 44A, 44B. Accordingly, when the bottom wall 18 is displaced by a predetermined amount or more at the time of thermal contraction of the fuel tank main body 19, the stoppers 56A, 56B abut the expansion restricting portions 58A, 58B due to relative displacement. As a result, the expansion restricting portions 58A, 58B is reliably prevented from entering into the interiors of the deformation absorbing portions 48A, 48B (the U-shaped portions).

Still further, the deformation absorbing portions 48A, 48B absorb deformation inputted from the bottom wall 18 side, and, by deforming, absorb load transmitted from the built-in part 24 side, and thereby may mitigate stress applied to the fixed position of the built-in part 24 at the bottom wall 18.

Further, the plate thickness of the root portions 68A, 68B of the fixed portions 32A to 32C is made to be thicker than the plate thickness of the deformation absorbing portions 48A, 48B. Due thereto, when excessive stress is transmitted from the built-in part 24 side to the bottom wall 18 side, the deformation absorbing portions 48A, 48B bend from the root portions 68A, 68B, and transmission of excessive stress from the built-in part 24 to the bottom wall 18 may be prevented.

Note that, in the present embodiment, description is given with the contraction center C of the bottom wall 18 of the fuel tank main body 19 at the time of blow molding being the center in the length direction of the built-in part 24. However, embodiments are not limited to this and the contraction center C may be a position that is apart from the built-in part 24. In this case, since the anchor stands 46 (the bottom portions 60) of the crimp portions 38A, 38B move in the same direction, the arrangement of the tongue pieces 44A, 44B at the crimp portions 38A, 38B is not symmetrical to the left/right as in the present embodiment, and rather, is the same.

Further, in the present embodiment, at the time of contraction of the fuel tank main body 19, deformation of the bottom wall 18 is prevented due to the fixed portions 32A-32C of the built-in part 24 abutting the bottom wall 18. However, embodiments are not limited to this and there may be a configuration in which projecting portions that project-out downward are provided at the fixed portions 32A-32C. In this case, contracting deformation of the bottom wall 18 is prevented due to the bottom wall 18 abutting the projecting portions.

The invention claimed is:

1. A resin fuel tank comprising:
    a fuel tank main body in which a closed space for storing fuel is formed in its interior;
    a built-in part that is disposed within the closed space and is fixed to a wall portion of the fuel tank main body by at least two mounting portions;
    connecting portions of the built-in part, which are separated from the wall portion and that connect the two mounting portions; and
    deformation absorbing portions of the built-in part, which are elastically deformable, are upside-down U-shaped as seen in side view, and are provided between the mounting portions and the connecting portions, one ends of the deformation absorbing portions being fixed to the connecting portions, and other ends of the deformation absorbing portions being separated from the connecting portions in a height direction.

2. The resin fuel tank of claim 1, comprising reinforcing portions that are provided at boundary portions between the deformation absorbing portions and the connecting portions, and whose plate thickness is thicker than a plate thickness of the deformation absorbing portions.

3. The resin fuel tank of claim 1, comprising:
   abutting portions that are provided at the connecting portions; and
   first contact portions that are provided between the deformation absorbing portions and the mounting portions, and that contact the abutting portions due to the abutting portions moving relatively to the mounting portions along the wall portion in a first direction.

4. The resin fuel tank of claim 3, comprising second contact portions that are provided between the deformation absorbing portions and the mounting portions, and that contact the abutting portions due to the abutting portions moving relatively to the mounting portions along the wall portion in a second direction that is a direction opposite from the first direction.

* * * * *